TRANSISTOR CIRCUIT FOR ENERGIZING ELECTROLUMINESCENT ELEMENTS

Filed May 24, 1961 2 Sheets-Sheet 1

| DECIMAL DISPLAY | DISPLAY | BINARY |
|---|---|---|
| 0 | abcefg | 0000 |
| 1 | cf | 0001 |
| 2 | acdeg | 0010 |
| 3 | acdfg | 0011 |
| 4 | bcdf | 0100 |
| 5 | abdfg | 0101 |
| 6 | abdefg | 0111 |
| 7 | acf | 0110 |
| 8 | abcdefg | 1000 |
| 9 | abcdfg | 1001 |

INVENTOR
CONSTANTINE RHODES
BY
Spencer E. Olson
ATTORNEY

INVENTOR
CONSTANTINE RHODES
BY
Spencer E. Olson
ATTORNEY 3,246,202

TRANSISTOR CIRCUIT FOR ENERGIZING ELECTROLUMINESCENT ELEMENTS

Constantine Rhodes, Boston, Mass., assignor to Sylvania Electric Products Inc., a corporation of Delaware Filed May 24, 1961, Ser. No. 112,396
8 Claims. (Cl. 315—170)

This invention relates to electroluminescent devices, and, more particularly, to circuitry for energizing such devices.

Certain types of phosphors, when placed in an electric field, will luminesce, the intensity of the emitted light being some function of the strength of this applied field. Consequently, films or layers containing such phosphors can be used to transform electrical energy to light energy. Phosphors of this type are said to be electroluminescent. Alternating current voltage has been used in the art to produce seemingly constant electroluminescence since, if the frequency of the applied alternating current voltage is high enough, the bursts of electroluminescence due to build-up and collapse of the electric field occur at intervals shorter than the retentivity of the eye making the electroluminescence appear to be continuous.

To excite typical electroluminescent lamps to the desired intensity, alternating current power at about 200 volts and 400 to 1600 cycles per second is required, whereas to turn the lamp completely off, the voltage must be reduced to less than 50 volts. This characteristic of the device poses a difficult switching problem in situations where it is desirable to rapidly turn the lamp on and off, for example in a display device consisting of segmented characters. It is convenient in some applications to control the energization of the segments in such a display with logic circuitry such as flip-flop circuits, the outputs of which consist of two D.C. voltage levels, a "high" level which indicates one state of condition of the flip-flop and a "low" level indicating the other state of conduction.

It is a primary object of the present invention to provide a circuit for converting direct current voltage levels of a logic circuit to suitable alternating current voltage levels to operate an electroluminescent lamp.

Another object of the invention is to provide a voltage level conversion system which does not couple alternating current signals back to the logic circuit.

Still another object of the invention is to provide a circuit for converting direct current voltage levels of a magnitude encountered in transistorized circuitry to alternating current voltage levels necessary to operate an electroluminescent lamp without power amplification of the direct current voltage levels.

Another object of the invention is to provide a circuit having the foregoing characteristics which may be fabricated from a small number of available, inexpensive components.

The invention has application and will be described in connection with a display system consisting of a plurality of segmented numeric characters arranged in rows, five digits to a row and useful to display flight status information. The first digit in each row may be the flight number and the following four digits display the time in the twelve hour time system. Logic circuitry in the system automatically updates the display when new status information on the posted flight is received. Information for display is introduced to the system in four-bit binary coded decimal (BCD) form and is stored in this form in storage registers, which may be flip-flops having the characteristics alluded to earlier. Before the binary coded decimal code can be displayed, it is translated to a seven-line code required to control the seven segments of the segmented numeric digits, and the signal level converted from the direct current levels found in the flip-flop circuits to the alternating current levels which are needed to operate the electroluminescent lamps of which the segments are formed.

In accordance with the invention, the level conversion circuit includes a transistor switch, the conduction of which is controlled by the direct current voltage levels of an associated flip-flop circuit. The transistor is arranged to drive a miniature audio transformer, the primary of which is connected in series with the transistor to a low voltage alternating current source, with the secondary of the transformer connected across the lamp. When the transistor is cut off, by application to the base thereof of the "low" voltage level from a flip-flop, it presents a higher impedance to the series A.C. circuit than the primary of the transformer with the result that the secondary voltage applied to the lamp is insufficient to operate it. Conversely, when the transistor is turned on by a "high" voltage level from the logic circuit, its saturation impedance to A.C. is low with respect to the impedance of the transformer primary, and the secondary output voltage is high enough to energize the lamp. In the system to be described the lamp is a part of an electroluminescent-photoconductor (EL-PC) translator of a type known to the art, but the invention is equally applicable for the energization of a separate EL lamp.

Other objects, features, and advantages of the invention will be apparent from the following detailed description, taken in conjunction with the accompanying drawings, in which.

Although the switching circuit of the invention has general applicability, its operation and advantages will be appreciated from a description of its operation in an electroluminescent display system, such as might be employed for displaying flight status information. In such a display, pictorially illustrated in FIG. 2A, it is convenient to arrange numerical digits in a plurality of rows each containing five digits, the first digit in each row representing a flight number from one to nine. The remaining four digits in each row indicate time in the twelve hour time system. Logic circuitry in the system, which will briefly be described, provides two automatic modes of operation. New information concerning a flight which is already posted will automatically up-date the display without altering the position on the board, and new information relating to a flight which does not appear on the board is automatically entered into the top row of the display, causing previous rows to shift downward while keeping the displayed information in the correct time sequence. The system may be operated either from a keyboard or from a paper tape reader. A keyboard, if used, consists of five decades, corresponding to the five digits in a row, plus a key for entry and a key for clearing the display board.

Figure 1:
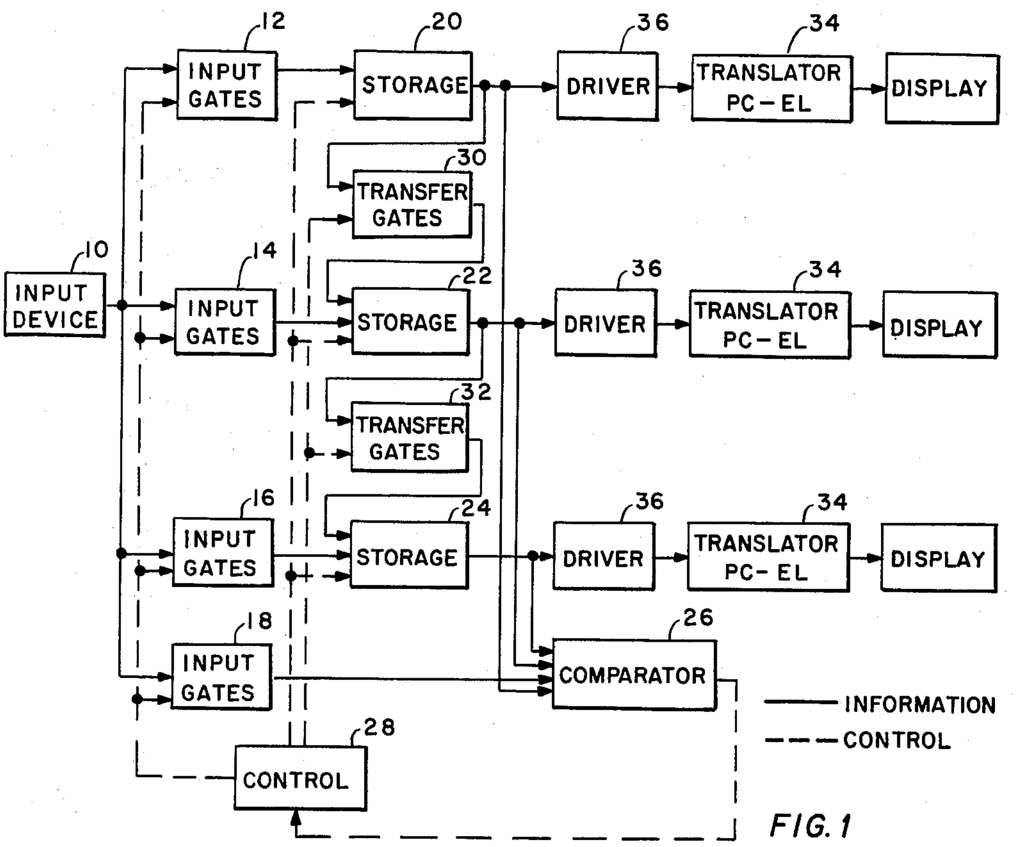
FIG. 1 is a functional block diagram of a display system in which the invention finds application.

Referring to the functional block diagram of FIG. 1, information for display originates at an input device 10, which may be either a keyboard or a tape reader, in four-bit binary coded decimal form. Each digit is formed in parallel on four lines, and five digits are formed sequentially, in time, to make a word. In this word the flight number appears first, followed by the time digits in decreasing order of importance. The information supplied by the input device 10 is applied simultaneously to four sets of input gates 12, 14, 16 and 18, the first three of which respectively control the application of information to storage registers 20, 22 and 24 for each row of the display. The fourth input gate 18 admits the first digit (flight number) to a comparator 26 where a comparison is made with the flight number in each of the storage registers. If there is a successful comparison, comparator 26 enables control circuitry 28 which, in turn, opens the input gate for the row in which that flight number is already stored. This is known as an up-date cycle. If there is not a successful comparison, the control 28 initiates a five-step program of clearing each storage register and transferring in the information from the register immediately above it. When this sequence is completed, the upper register 20 is cleared and its input gate 24 is opened to accept the incoming word. This is called the normal cycle. Transfer gates 30 and 32 are provided for the transfer of stored information from register 20 to 22, and from 22 to 24, respectively.

Storage registers 20, 22 and 24 each consist of sixteen transistorized flip-flop circuits which store the display information in binary coded decimal form. In this system, it was possible to reduce the number of storage flip-flops from twenty (five digits times four bits per digit) to sixteen since the first time digit in a twelve-hour system is never greater than one, and the third time digit is never greater than five.

Figure 2:
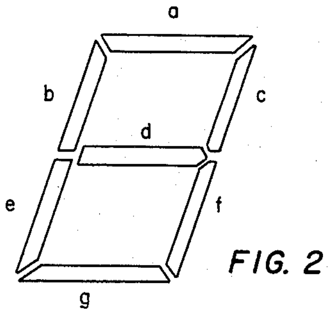
FIG. 2 is a diagrammatic representation of a segmented display character and a numeric logic table for the energization thereof.
Figure 2A:
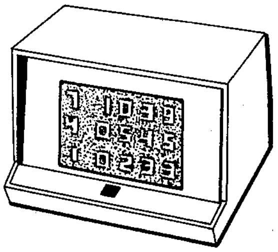
FIG. 2A is a pictorial illustration of the display portion of the system of FIG. 1.

It is the transfer of stored information from the registers to a display board of the type shown in FIG. 2A with which the present invention is concerned. To effect this transfer, the binary coded decimal code stored in the registers must be translated to a seven line code for controlling the seven-segment numeric display devices, one of which will be described in connection with FIG. 2. Also, the direct current voltage levels in the registers representative of the coded information stored therein must be converted to the alternating current voltage levels needed to operate electroluminescent devices. Before describing how these functions are performed, the nature of the electroluminescent display device and a suitable translator for converting from the binary coded decimal code to a seven-line code will be described.

In the illustrated flight status display board each of the digits consists of seven segments arranged roughly in a figure-eight pattern as shown in FIG. 2. Each of the segments *a* through *g* is a separate EL lamp, and any number from 0 to 9 may be formed by energizing the proper combination of segments per the accompanying table. The segmented pattern is conveniently formed on a glass substrate, and with available techniques it is possible to form, on a single sheet of glass, the fifteen characters required in the present system. As an example of a suitable construction, a transparent front electrode is placed on one surface of a sheet of glass, and a layer of suitable phosphor applied over this electrode. Then, electrodes shaped to correspond to the segments of the character are applied over the phosphor, as by deposition of aluminum. When one or more of the segments are energized, light emitted by the phosphor passes through the transparent front electrode and is visible through the glass. For a more complete description of the segmented display pattern of FIG. 2, and methods for fabricating the same, attention is invited to an article by I. Greenberg appearing in the March 24, 1961, issue of "Electronics," entitled "Electroluminescent Display and Logic Devices."

Figure 3:
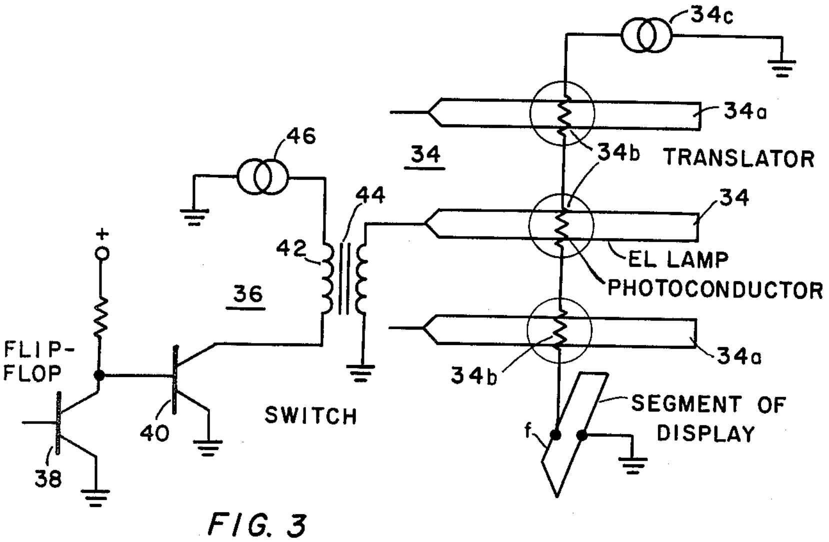
FIG. 3 is a schematic diagram showing the manner in which the invention is employed in the system of FIG. 1.

Inasmuch as the representation of a particular digit requires the selective energization of from two to seven of the segments of the pattern of FIG. 2, it is necessary to translate the binary coded decimal code in storage registers 20, 22 and 24 to a seven line code. This is conveniently accomplished in a small volume by matrices of electroluminescent lamps and photoconductive elements which are known to the art as EL-PC translators. Briefly, the translator for this application consists of two sheets of glass, one carrying eight parallel strip electroluminescent lamps, commonly called "bar lamps," and the other carrying a series-parallel array of printed photoconductive elements. The electroluminescent lamps 34*a* are driven by the driver circuits 36 of the present invention from a complemented four-bit binary input, derived from storage elements 20, 22 and 24, so that four of the lamps in each display are lighted at all times. As shown in FIG. 3, the PC elements 34*b* are connected in series-parallel combinations between a common alternating current power supply 34*c* and individual segments of the numeric display pattern of FIG. 2. Light from the electroluminescent lamps passes through a light mask (represented by the circles) and falls on selected ones of the photoconductive elements, decreasing their impedance and raising the voltage on selected electroluminescent display segments. Fifteen of such translators are required in the present system, one to drive each of the fifteen display patterns. Except insofar as the electroluminescent lamp portion of the translator is driven by the improved driving circuit of the invention, the translator forms no part of the claimed invention and is here disclosed only as a component of a system in which the present invention finds utility. Further details on the construction and operation of the translator will be found in the Greenberg article referred to above.

Having described a suitable EL-PC translator to convert the binary coded decimal data in the storage registers to a seven line code to drive the individual elements of the display characters, attention is now directed to the drive circuitry 36 for converting the direct current voltage levels in the storage registers to suitable alternating current voltage levels for energizing the individual EL lamps of the translator. In a typical transistorized storage register, the available voltage levels from the storage flip-flops is zero volts for a binary "zero" and plus six volts for a binary "one." These voltage levels are alternately present at the collectors of the two cross-connected transistors normally utilized in a flip-flop circuit. One of the two transistors in a storage flip-flop is schematically shown at 38 in FIG. 3, the voltage at its collector going from zero when the translator is conducting to plus six volts when the transistor is non-conducting. To insure proper translation, it is necessary to apply approximately 200 volts R.M.S. to the EL bar lamp of the translator for a binary "one" input, and to keep the voltage applied to the lamp below 50 volts R.M.S. for a binary "zero" input. These R.M.S. values are typical for lamps of the type used in the above-described translators, but it is to be understood that these values are illustrative only, and are not to be considered in a limiting sense.

Basically, the voltage level conversion is accomplished by a transistor switch 40 connected in series with the primary winding 42 of a miniature audio transformer 44 and a source of alternating current voltage 46. The turns ratio of the transformer 44 is selected to provide the necessary step-up in voltage from the voltage output of the source 46 to drive the EL lamp, which is connected across the secondary of the transformer as shown. The parameters of the switching circuit are so chosen that when transistor 40 is cut off, which occurs when the voltage on the collector of the storage flip-flop is at its "low" value, the transistor presents a much higher impedance in the series alternating current circuit than the primary 42 of the transformer. Consequently, most of the voltage from source 46 is dropped across transistor 40, and the output voltage of the transformer secondary is too low to light the lamp 34*a*. On the other hand, when transistor 40 is caused to conduct by application of the "high" voltage level from the flip-flop, it saturates and presents its saturation impedance in series with the primary 42 of the transformer. The saturation impedance of the transistor to alternating current is low with respect to the impedance of the primary of the transformer, and most of the alternating current voltage is dropped across the primary of the transformer to cause an output voltage at the terminals of the secondary sufficiently high to excite the lamp. Accordingly, the electroluminescent lamp 34*a* in the diagrammatic representation of FIG. 3 is lit when the collector of the illustrated transistor of the flip-flop is "high," representative of a binary "one," and is extinguished when the D.C. level is "low," representative of a binary "zero."

A specific circuit for performing the functions outlined in connection with FIG. 3 will now be described with reference to FIG. 4. The electroluminescent lamp to be driven is shown at 34*a*, connected across the secondary of transformer 44, with one terminal connected to ground. The equivalent circuit of a typical available electroluminescent lamp having an area of one square inch is a 1000 picofarad capacitor in parallel with a 400K resistance. For lamps with smaller areas, the capacitance would be correspondingly decreased and the resistance increased. One terminal of a source of alternating current voltage 46 is connected to one terminal of the primary 42 of the transformer, the A.C. source being connected in series with a source of direct current potential 48, such as a battery, to the emitter of transistor 40. The negative terminal of battery 48 and the emitter of the transistor are connected to ground. Depending upon the phosphor used in the lamp, the frequency of the alternating current source may be between 400 and 1600 cycles per second. For purposes of the present description, a frequency of 1600 cycles per second will be assumed. Battery 48 has a value so related to the peak value of the A.C. voltage as to bias the collector of transistor 40 to hold the A.C. voltage above ground over its full negative swing. If any part of the A.C. cycle were below ground, rectification would take place in the transistor due to forward biasing of the collector-base diode. On the other hand, this bias also raises the positive voltage peaks to levels approaching the collector breakdown voltage of the transistor, limiting to some extent the types of transistors which may be used.

A blocking capacitor 50 is connected in series between the other terminal of the primary of the transformer and the collector of transistor 40 to prevent the voltage from battery 48 saturating the primary. A load resistor 52 connected in parallel with the series combination of transformer primary and blocking capacitor accordingly determines the direct current saturation characteristic of transistor 40. The control voltage levels from the flip-flop (FIG. 3) are applied to terminal 54 and coupled to the base of transistor 40 through resistor 56. The operating voltages of the transistor are adjusted to the voltage conditions of the flip-flop by a voltage divider consisting of resistors 58 and 60 together with resistor 56, connected in series between a source of D.C. potential, represented by terminal 62, and ground.

Because of the interdependence of the components in the circuit, and the fact that the voltage and current relationships necessarily change appreciably between the "on" and "off" conditions of the transistor, care must be exercised in the selection of component values. The necessary circuit parameters may be summarized as follows:

(1) $$\frac{X_{EL}}{N^2} > 10R_{sat}$$

where $X_{EL}$ is the reactive impedance of lamp 34*a*, N is the turns ratio of the transformer, and $R_{sat}$ is the saturation impedance of the transistor.

(2) Maximum current rating of transistor $$\geq \frac{E_{46}N^2}{X_{EL}} + \frac{E_{48}}{R_{52}}$$

(3) $E_{48} \geqq E_{46}$ (peak)

(4) Collector breakdown voltage $$(BV_{ceo}) \geqq E_{48}+_{46} \text{ (peak)}$$

Therefore, maximum allowable $$E_{46}\text{(R.M.S.)} = \frac{BV_{ceo}}{2.8}$$

(5) Reactive impedance of $$C_{50} \lesseqgtr \frac{X_{EL}}{10N^2}$$

Compromises between these parameters, primarily by adjusting turns ratio against the parameters of available transistors, results in a circuit which gives a suitable change in the impedance of the transistor between its non-conducting and conducting conditions that the voltage appearing across the lamp 34*a* is insufficient to light it and sufficient to energize it to proper brightness, respectively, without exceeding the current and voltage ratings of the transistor. In a circuit which has been satisfactorily operated, a type 2N35 was used because of its collector breakdown voltage of 40 volts, and its maximum current rating of 100 ma. Recalling parameter (4) above, the maximum allowable alternating current voltage for this transistor is $$\frac{40}{2.8} = 14.3 \text{ volts R.M.S.}$$

To prevent rectification in the transistor during negative cycles, $E_{48}$ must be at least 14.3×1.4 or 20 volts. Since the breakdown voltage of the 2N35 permitted it, a potential of 22 volts for battery 48 was selected. Since 200 volts R.M.S. is required to energize lamp 34*a*, for a source voltage of 14.3 volts R.M.S., the turns ratio of transformer 44 must be, $$N = \frac{200}{14.3} = 14$$

Of available audio transformers having the most nearly ideal characteristic, the best was one having a turns ratio of 16 and primary and secondary resistances of 50,000 ohms and 200 ohms, respectively. With this available turns ratio, the R.M.S. value of A.C. source 46 could be reduced to $$\frac{200}{16} = 12.5 \text{ volts}$$

without changing the value of battery 48. For other reasons, however, it is desirable to use an input signal of 14.3 volts. Remembering that the reactance of decoupling capacitor 50 should be equal to or less than $$\frac{X_{EL}}{10N^2}$$

and that the impedance of a typical lamp in parallel with the secondary winding of the selected transformer is about $-j45{,}000$, a capacitance of 5 microfarads was selected.

Using the foregoing values for the described parameters, other component values in a successfully operated circuit were as follows:

| | |
|---|---|
| $R_{52}$ | 11K ohms. |
| $R_{56}$ | 1.5K ohms. |
| $R_{58}$ | 1.8K ohms. |
| $R_{60}$ | 390 ohms. |
| Potential source **62** | +12 volts D.C. |

With these circuit values, when a D.C. potential of approximately zero volts (indicative of a binary "zero") is applied to terminal 54, the transistor does not conduct significantly and the potential from the collector to ground is 21.8 v. D.C. and 14.0 volts R.M.S. That is, substantially all of the A.C. voltage appears across the transistor, with very little appearing across the primary 42; indeed, the secondary voltage was only 8.6 volts R.M.S., insufficient to light the lamp. However, when a +6 volts D.C. signal is applied to terminal 54 (a binary "one"), the transistor is driven to saturation, the collector to ground potential goes to zero volts D.C. and 0.075 volts R.M.S., and the output voltage across the secondary of the transformer is 200 volts R.M.S. The fact that an input voltage of 14.3 volts R.M.S. is needed to obtain an output voltage of 200 volts R.M.S. (instead of 12.5 volts) is because of losses in the transformer, a small A.C. voltage drop across decoupling capacitor 50, and rectification of a small portion of the negative peaks of the A.C. voltage in the collector-base diode of the transistor. The disclosed circuit arrangement prevents feedback of A.C. or transients to the logic circuitry, and operates satisfactorily in spite of reasonable variations in the values of D.C. supplies 48 and 62, and expected variations in the output levels of the logic circuitry. While the circuit parameters listed above were selected for operation at 1600 cycles per second, the circuit has been found to perform satisfactorily at frequencies between 1000 and 1600 cycles per second. If it is desired to operate at lower frequencies, the value of the reactive components of the circuit should be changed accordingly.

Figure 4:
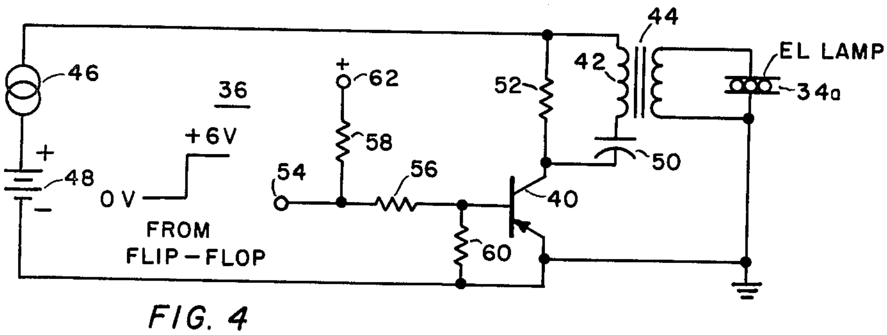
FIG. 4 is a circuit diagram of one embodiment of the switching circuit of the invention.
Figure 5:
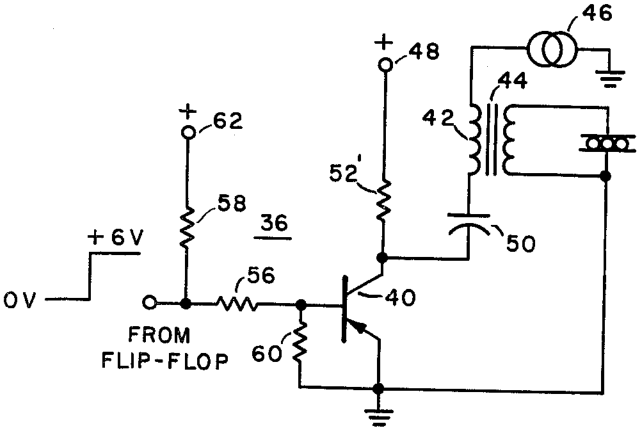
FIG. 5 is a circuit diagram of another embodiment of the switching circuit.

While the series A.C-D.C. supply voltage of the circuit of FIG. 4 is preferred because of its minimum power consumption, the supply voltages can also be applied in parallel as shown in FIG. 5, wherein all of the component values are the same as in FIG. 4 except for load resistor 52' which is increased in resistance by 1000 ohms. The circuit of FIG. 5 operates in essentially the same manner as the circuit of FIG. 4 except that there is some loss of A.C. power due to the A.C. path through load resistor 52' and D.C. source 48. Also, because the secondary voltage in the "off" condition is determined by the ratio of the transformer impedance to the resistance of load resistor 52' instead of by the ratio of the transformer impedance to the impedance of the non-conducting transistor, the secondary voltage is increased to about 15 volts R.M.S. This increase is insufficient, however, to illuminate lamp **34*a***.

From the foregoing it is seen that applicant has provided a simple, reliable and inexpensive circuit for controlling the application of alternating current energizing materials to an EL lamp in response to changing direct current levels encountered in logic or storage circuitry. Although the circuit has been illustrated as driving an EL lamp constituting a part of an EL-PC translator, it is to be understood that it is equally useful for driving lamps of other forms. It will be appreciated also that the nature of the lamp itself determines the values of some of the components of the drive circuit, and that, therefore, the values given should be considered as illustrative only. Further modifications will also occur to those skilled in the art, including other types of transistors, and all such are considered to fall within the spirit and scope of the invention as defined in the appended claims.

What is claimed is:

1. A circuit for controlling the application of alternating current energizing potential to an electroluminescent element to turn the same off and on in response to changes in direct current voltage levels comprising, a transformer having primary and secondary windings, means connecting said electroluminescent element across said secondary winding, a source of alternating current potential and a transistor connected in series with said primary winding, means normally biasing said transistor off in which condition insufficient potential is developed across said secondary winding to turn said element on, and means for applying a direct current voltage level to said transistor of a magnitude to cause it to conduct to saturation in which condition sufficient potential to turn said element on is developed across said secondary winding.

2. A circuit for controlling the application of alternating current energizing potential to an electroluminescent element to turn the same off and on in response to changes in direct current voltage levels from a first to a second magnitude comprising, a transformer having primary and secondary windings, means connecting said element across said secondary winding, a source of alternating current potential and a transistor connected in series with said primary winding, means biasing said transistor which renders the transistor non-conducting during application thereto of a direct current voltage of said first magnitude and which allows said transistor to conduct to saturation during application thereto of a direct current voltage of said second magnitude, in which condition the impedance of said transistor to alternating current is sufficiently lower than the impedance of said primary winding that a potential of a magnitude sufficient to energize said element is developed across said secondary winding.

3. A circuit for turning an electroluminescent lamp off and on in response to the application of direct current switching voltages comprising, a transformer having primary and secondary windings, means connecting said lamp across said secondary windings, a source of alternating current potential, a transistor having base, collector, and emitter electrodes, means connecting said source of alternating current potential, the primary of said transformer, and said transistor in series in the order named with the emitter and collector of said transistor respectively connected to one terminal of said source of alternating current potential and to one terminal of said primary winding, means normally biasing said transistor off in which condition its impedance to alternating current is appreciably higher than the impedance of the primary winding of said transformer and insufficient potential is developed across said secondary winding to energize said lamp, and means for applying a direct current voltage signal to the base of said transistor of sufficient magnitude to cause it to conduct to saturation in which condition its impedance to alternating current is appreciably lower than the impedance of said primary winding and sufficient voltage to energize said lamp is developed across said secondary winding.

4. A circuit for turning an electroluminescent lamp off and on in response to changes in magnitude of direct current switching voltages from a first to a second value comprising, a transformer having primary and secondary windings, means connecting said lamp across said secondary winding, a source of alternating current potential of a frequency suitable to energize said lamp, a transistor having base, collector, and emitter electrodes, means connecting said source of alternating current potential, the primary of said transformer, and said transistor in series in the order named with the emitter and collector of said transistor respectively connected to one terminal of said source of alternating current potential and to one terminal of said primary winding, a source of direct current potential connected to an electrode of said transistor for biasing said transistor to prevent rectification of said alternating current potential, means biasing said transistor which renders the transistor non-conducting during application to the base thereof of a direct current voltage of said first value, in which condition the impedance of said transistor to alternating current is appreciably higher than the impedance of the primary winding of said transformer and insufficient potential is developed across said secondary winding to energize said lamp, said last-mentioned biasing means allowing said transistor to conduct to saturation during application to the base of said transistor of a direct current voltage of said second value, in which condition the impedance of said transistor to alternating current is appreciably lower than the impedance of said primary winding and an alternating current voltage sufficient to energize said lamp is developed across said secondary winding.

5. A circuit operative in response to changes in direct current voltage levels from a first to a second value to turn an electroluminescent element off and on comprising, an audio transformer having primary and secondary windings, means connecting said electroluminescent element in parallel with said secondary winding, a transistor having base, collector, and emitter electrodes, a source of alternating current potential, a capacitor, means connecting said source of alternating current potential, said primary winding and said capacitor in series in the order named to the collector of said transistor, means connecting the emitter of said transistor to a source of reference potential, a load resistor connected in parallel with the series combination of said capacitor and said primary winding, a source of direct current potential for biasing said transistor to prevent the negative cycles of the signal from said alternating current potential source going below said reference potential, means for biasing said transistor to be off during application to the base electrode thereof of a direct current voltage of a first value and to allow said transistor to conduct the saturation during application to said base of a direct current voltage of a second higher value, the saturation impedance of said transistor to alternating current being sufficiently lower than the impedance of said primary winding that a voltage of sufficient magnitude to excite said electroluminescent element is developed across said secondary winding when said transistor is conducting.

6. A circuit operative in response to changes in direct current voltage levels from a first to a second higher value to turn an electroluminescent element off and on comprising, an audio transformer having primary and secondary windings, means connecting said electroluminescent element in parallel with said secondary winding, a transistor having base, collector, and emitter electrodes, a source of alternating current potential of frequency appropriate to excite said electroluminescent element, a capacitor, means connecting said source of alternating current potential, said primary winding and said capacitor in series in the order named to the collector of said transistor, means connecting the emitter of said transistor to a source of reference potential, a load resistor connected in parallel with the series combination of said capacitor and said primary winding, a source of direct current potential for biasing said transistor to prevent negative cycles of the alternating current signal from said source going below said reference potential, means for biasing said transistor to be off during application to its base of a direct current voltage of said first value and to cause said transistor to conduct to saturation during application to said base of a direct current voltage of said second value, the saturation impedance of said transistor to alternating current being sufficiently lower than the impedance of said primary winding that a voltage of sufficient magnitude to excite said electroluminescent element is developed across said secondary winding when said transistor is conducting.

7. A circuit in accordance with claim 6 wherein said source of direct current potential is connected in series with said source of alternating current potential.

8. A circuit in accordance with claim 6 wherein said source of direct current potential is connected in parallel with said source of alternating current potential.

References Cited by the Examiner

UNITED STATES PATENTS

| | | | |
|---|---|---|---|
| 2,863,070 | 12/1958 | Suran et al. | |
| 2,937,298 | 5/1960 | Putkovich et al. | |
| 2,958,009 | 10/1960 | Bowerman | 315—169 |
| 2,979,625 | 4/1961 | Bothwell et al. | |

FOREIGN PATENTS

| | | |
|---|---|---|
| 785,884 | 11/1957 | Great Britain. |

GEORGE N. WESTBY, *Primary Examiner.*

ARTHUR GAUSS, *Examiner.*